United States Patent
Tsushima

(10) Patent No.: US 7,688,270 B2
(45) Date of Patent: Mar. 30, 2010

(54) NEAR FIELD COMMUNICATION ANTENNA AND MOBILE DEVICE

(75) Inventor: Takaaki Tsushima, Saitama (JP)

(73) Assignee: Sony Ericsson Mobile Communications Japan, Inc., Tokyo (JP)

(*) Notice: Subject to any disclaimer, the term of this patent is extended or adjusted under 35 U.S.C. 154(b) by 0 days.

(21) Appl. No.: 12/036,487

(22) Filed: Feb. 25, 2008

(65) Prior Publication Data
US 2008/0238799 A1    Oct. 2, 2008

(30) Foreign Application Priority Data
Mar. 26, 2007    (JP)    ............... 2007-078966

(51) Int. Cl.
*H01Q 7/08*    (2006.01)
(52) U.S. Cl. ............... 343/788; 343/787; 343/702
(58) Field of Classification Search ......... 343/741, 343/742, 718, 788, 702, 787
See application file for complete search history.

(56) References Cited

U.S. PATENT DOCUMENTS

| | | | |
|---|---|---|---|
| 3,683,389 A * | 8/1972 | Hollis ............... | 343/788 |
| 4,760,394 A * | 7/1988 | Takeuchi et al. ......... | 340/10.42 |
| 4,937,586 A * | 6/1990 | Stevens et al. ............. | 343/702 |
| 5,134,392 A * | 7/1992 | Takeuchi et al. ........... | 340/5.62 |
| 5,808,558 A * | 9/1998 | Meek et al. ............. | 340/870.01 |
| 2002/0163474 A1 | 11/2002 | Ieda et al. | |
| 2006/0028384 A1 * | 2/2006 | Akiho et al. ................. | 343/742 |

FOREIGN PATENT DOCUMENTS

| | | |
|---|---|---|
| JP | 9-200117 | 7/1997 |
| JP | 2006-31508 | 2/2006 |
| JP | 2006-197510 | 7/2006 |
| WO | WO 98/36469 | 8/1998 |

* cited by examiner

*Primary Examiner*—HoangAnh T Le
(74) *Attorney, Agent, or Firm*—Oblon, Spivak, McClelland, Maier & Neustadt, L.L.P.

(57) ABSTRACT

An NFC antenna ("NFC" stands for "near field communication") includes a ferrite antenna including a primary antenna coil wound on a ferrite core of the ferrite antenna; a loop coil provided in a position where components of a magnetic flux on a non-communication direction side interlink, the magnetic flux being generated by the ferrite antenna; and a loop coil switching unit for switching between a mode for forming a loop of the loop coil and a mode for disconnecting the loop.

8 Claims, 6 Drawing Sheets

BACKGROUND ART

BACKGROUND ART

NEAR FIELD COMMUNICATION ANTENNA AND MOBILE DEVICE

CROSS REFERENCES TO RELATED APPLICATIONS

The present invention contains subject matter related to Japanese Patent Application JP 2007-078966 filed in the Japanese Patent Office on Mar. 26, 2007, the entire contents of which being incorporated herein by reference.

BACKGROUND OF THE INVENTION

1. Field of the Invention

The present invention relates to a near field communication (NFC) antenna well suited for use in RFID (radio frequency identification, which is a generic name of contactless or proximity recognition techniques using electromagnetic waves) and a mobile device including an NFC communication portion and using the NFC antenna 2. Description of the Related Art Recently, an RFID function is mounted in a standard manner on mobile devices, such as mobile phones. In past and existing techniques, a loop antenna has been used as an antenna of an NFC communication portion to realize the RFID function.

Recently, however, miniaturization or compactness and thinning are strongly demanded for mobile devices. In order to meet the demand, such a loop antenna, which is relatively large in size, cannot be mounted, such that it is difficult to secure a sufficiently necessary communication distance.

In addition, there have been developed ferrite antennas that are smaller in size than loop antennas, but have functional characteristics higher than or equivalent to the characteristics of loop antennas. Further, improvements have been made with respect to the communication distance by improving the reception sensitivity of an RFID LSI (large scale integration) circuit constituting an RFID control portion of the NFC communication portion.

The improvement, therefore, results in increasing the reception sensitivity, thereby making it possible to perform reception even in a remote site. At the same time, however, there occurs a problem in that interference is likely to receive from RFID readers/writers (reading/writing devices) other than a far-end communication device in operation. Particularly, a system employing ASK modulation (ASK: amplitude shift keying) likely to receive disturbance due to interference from other reading/writing devices.

As such, as reader/writer functions are increasingly mounted in various devices, and such devices increases in near sites, communication jamming due to interference increases. In this case, the various devices include, for example, office gate/door control devices (or, entrance/exit control devices), vending machines, green ticket reading machines in trains, notebook personal computers, and mobile phone terminals.

As countermeasures for such interference, it is advantageous to enhance the directivity of an NFC antenna, thereby to concentrate sensitivity on the direction of the far-end communication device, such as reading/writing device. As a method for enhancing the directivity, a method such as described herebelow is known.

FIGS. 5A to 5C are explanatory view showing means or manners for enhancing the directivity of a loop antenna. With reference to FIGS. 5A to 5C, numeral 1 represents the entirety of the loop antenna. As shown in FIG. 5A, the loop antenna 1 is formed in such a manner that a loop-shaped coil 3 is formed on one side of a flexible substrate 2 by printing, for example.

When current (current or induction current of a transmission signal) flows through the coil 3 of the loop antenna 1, as shown by a broken line 4 in FIG. 5B, a magnetic flux occurs spreading in exactly identical patterns to one another on the side having the coil 3 of the flexible substrate 2 and the reverse side. More specifically, the loop antenna 1 exhibits the same characteristics of directivity on the side having the antenna coil 3 of the flexible substrate 2 and the reverse side.

With reference to FIG. 5C, in order to enhance the directivity of the loop antenna 1 along the one direction, a magnetic material 5 having a high magnetic factor is adhered on any of the side, which has the antenna coil 3 of the flexible substrate 2, and the reverse side.

In the configuration thus formed, as shown by a broken line 6 in FIG. 5C, the magnetic flux on the side having the magnetic material 5 passes mainly through the inside of the magnetic material 5, but does not spread on the side having the magnetic material 5. Relatively, however, the magnetic flux on the side without the magnetic material 5 spreads to a long distance. Consequently, the reception sensitivity can be concentrated to the side without having the magnetic material 5, thereby making it possible to enhance the directivity in that direction.

With reference to FIGS. 6A to 6C, a manner for enhancing the directivity of a ferrite antenna will be described herebelow.

In FIG. 6A, numeral 11 represents the entirety of an example of a ferrite antenna. The ferrite antenna 11 of the example is of a bisectional type. As shown in FIG. 6A, the ferrite antenna 11 is configured such that the respective antenna coils 14a and 14b are formed in the manner that a single copper wire 13 is wound about each of two ferrite cores 12a and 12b, and respective antenna coils 14a and 14b are thereby formed.

Alternatively, the configuration of the ferrite antenna 11 can be such that the respective antenna coils 14a and 14b are formed in the manner that the copper wire 13 formed by as a conductive pattern on a flexible substrate is wounded on the respective ferrite cores 12a and 12b. Then, respective assemblies of wire windings on the ferrite cores 12a and 12b are connected together by the copper wire.

As shown by a broken line 15 in FIG. 6B, when the current (current or induction current of the transmission signal) flows through the antenna coils 14a and 14b of the ferrite antenna 11, the current passes through the insides of the respective ferrite cores 12a and 12b, and a magnetic flux occurs spreading in exactly identical patterns to one another on both sides of the ferrite cores 12a and 12b. More specifically, the ferrite antenna 11 exhibits the same characteristics of directivity on both sides of the ferrite cores 12a and 12b.

With reference to FIG. 6C, in order to enhance the directivity of the ferrite antenna 11, a metal plate 16 is disposed close to the ferrite cores 12a and 12b on which the copper wire 13 is wound.

More specifically, when the metal plate 16 is disposed close to the ferrite antenna 11 in the state the magnetic flux occurs as shown in FIG. 6B, overcurrent occurs in the direction of canceling the magnetic flux in the metal plate 16. Then, as shown by a broken line 17 in FIG. 6C, the magnetic flux on the side to which the metal plate 16 is placed close (the side will be referred to as "non-communication direction side") attenuates.

As the magnetic flux on the non-communication direction side is cancelled, self-inductances of the antenna coils 14a and 14b are reduced, whereby the current flowing through the antenna coils 14a and 14b are increased. Then, as shown by a broken line 18 in FIG. 6C, an increased amount of the current causes an increase in the magnetic flux on the opposite side (communication direction side) to the side to which the metal plate 16 is placed close. Consequently, the directivity on the communication direction side is enhanced.

Notes

Referential publications regarding the related techniques being described:

(Patent Document 1) Japanese Unexamined Patent Application Publication No. 2006-197510

(Patent Document 2) Japanese Unexamined Patent Application Publication No. 2006-031508

(Patent Document 3) Japanese Unexamined Patent Application Publication No. 09-200117

SUMMARY OF THE INVENTION

In the manner described above, the directivity of the NFC antenna in the communication direction (direction where a far-end communication device is present) can be enhanced, thereby making it possible to reduce the communication jamming due to interference.

In this connection, a recent system is configured to enable near field communication (NFC communication) between mobile devices, such as mobile phones. In the case the NFC communication is carried out between the mobile devices, the mounting position of the NFC antenna invisible from the outside, such that there arises another problem that the relationship between communicable positions cannot be intuitively known.

In order to address the problem, it is not necessary to enhance the unidirectional directivity, but, conversely, it is necessary to reduce the unidirectional directivity for enabling communication in a coverage are widened to a certain extent. This is a conflicting characteristic with the directive characteristic working to reduce the communication jamming due to interference.

In order to satisfy the two directive characteristics conflicting with one another, it is convenient if switching can be performed between the directivity characteristics corresponding to the case. More specifically, in the case of a long communication distance, the directivity in the communication direction is enhanced to thereby increase the reception sensitivity while preventing interference. On the other hand, in the case a near-field but wide communicable area is necessary, it is sufficient if the directivity can be reduced.

For example, in the case of the loop antenna 1 shown in FIGS. 5A to 5C, the directivity can be controlled in the manner of causing variation in the magnetic permeability or thickness of the magnetic material 5 or the distance between the loop antenna 1 and the magnetic material 5 shown in FIGS. 5A to 5C. As such, the control can be considered utilizable to satisfy the conflicting characteristics.

However, in the case of a mobile device, which is required to be thinned, priority is placed on, for example, the design and structural elements of the mobile device housing. In this case, it is difficult to secure spacing necessary for controlling the antenna directivity while increasing, for example, the thick of the magnetic material 5 or the distance between the loop antenna 1 and the magnetic material 5. Further, it is very difficult to realize a mechanical configuration for real time implementation of alteration or switching of, for example, the thick of the magnetic material 5 or the distance between the loop antenna 1 and the magnetic material 5.

Another problem is that when variation is caused in the distance between the loop antenna 1 and the magnetic material 5, also the resonant frequency of the loop antenna 1 is varied, so that a correcting device for correcting the resonant frequency has to be associatively operated.

The magnetic permeability of the magnetic material 5 is substantially determined in the material selection stage, such that it is impossible to arrange for variation.

In the case of the ferrite antenna 11 shown in FIGS. 6A to 6C, the directivity can be controlled in the manner of causing variation in, for example, the size of the metal plate 16 or the distance between the metal plate 16 and the ferrite antenna 11. Unlike the magnetic material 5, the metal plate 16 may be as a very thin copper foil. Further, the directivity can be controlled even in the manner of changing the area size of the metal plate 16, such that restrictions with respect to the mechanical configuration are fewer than in the case of the loop antenna 1.

Nevertheless, however, similarly as in the case of the loop antenna 1, it is difficult to enable real time switching in, for example, the position, size, or area size of the metal plate 16. Further, when the position, size, or area size of the metal plate 16, for example, is caused to vary, also the resonant frequency in the loop antenna 1 is varied, such that correction thereof is necessary.

Accordingly, it would be desirable to provide an NFC (near field communication) antenna enabling easy switching in directivity characteristic corresponding to the situation in order to satisfy the two conflicting directivity characteristics.

According to an embodiment of the present invention, there is provided an NFC antenna ("NFC" stands for "near field communication") including a ferrite antenna including a primary antenna coil wound on a ferrite core of the ferrite antenna; a loop coil provided in a position where components of a magnetic flux on a non-communication direction side interlink, the magnetic flux being generated by the ferrite antenna; and a loop coil switching unit for switching between a mode for forming a loop of the loop coil and a mode for disconnecting the loop.

In the NFC antenna of the embodiment of the present invention, in place of the metal plate shown in FIGS. 6A to 6C, the loop coil is provided in a position where components of a magnetic flux generated by the ferrite antenna on a non-communication direction side interlink.

In the event that the NFC antenna is set by the loop coil switching device to the mode for disconnecting the loop of the loop coil, the configuration corresponds to the configuration of the ferrite antenna as shown in FIG. 6B in which the metal plate is not present. In this case, the directivity is low, and communication in a wide coverage area can be performed.

Alternatively, in the event that the NFC antenna is set by the loop coil switching device to the mode for forming the loop of the loop coil, an overcurrent is generated in the loop coil by the interlinking magnetic flux generated from the ferrite antenna. In this case, in a manner similar to that described with reference to FIG. 6C, the directivity in the communication direction can be enhanced, and the reception sensitivity can be increased.

Consequently, according to the embodiment of the present invention, the NFC antenna can be provided in which switching control is performed by the loop coil switching device for forming and disconnection of the loop of the loop coil, whereby the communication mode can be easily switched between two modes. In one of the two modes, communication can be performed with a low directivity in a wide coverage; and in the other mode, the directivity in the communication direction is enhanced to be able to increase the reception sensitivity.

DETAILED DESCRIPTION OF PREFERRED EMBODIMENTS

Respective embodiments of an NFC antenna (NFC: near field communication) and mobile device according to the present invention will be described with reference to the accompanying drawings. The mobile device includes an NFC communication portion using the NFC antenna of the embodiment.

First Embodiment

Figure 1:
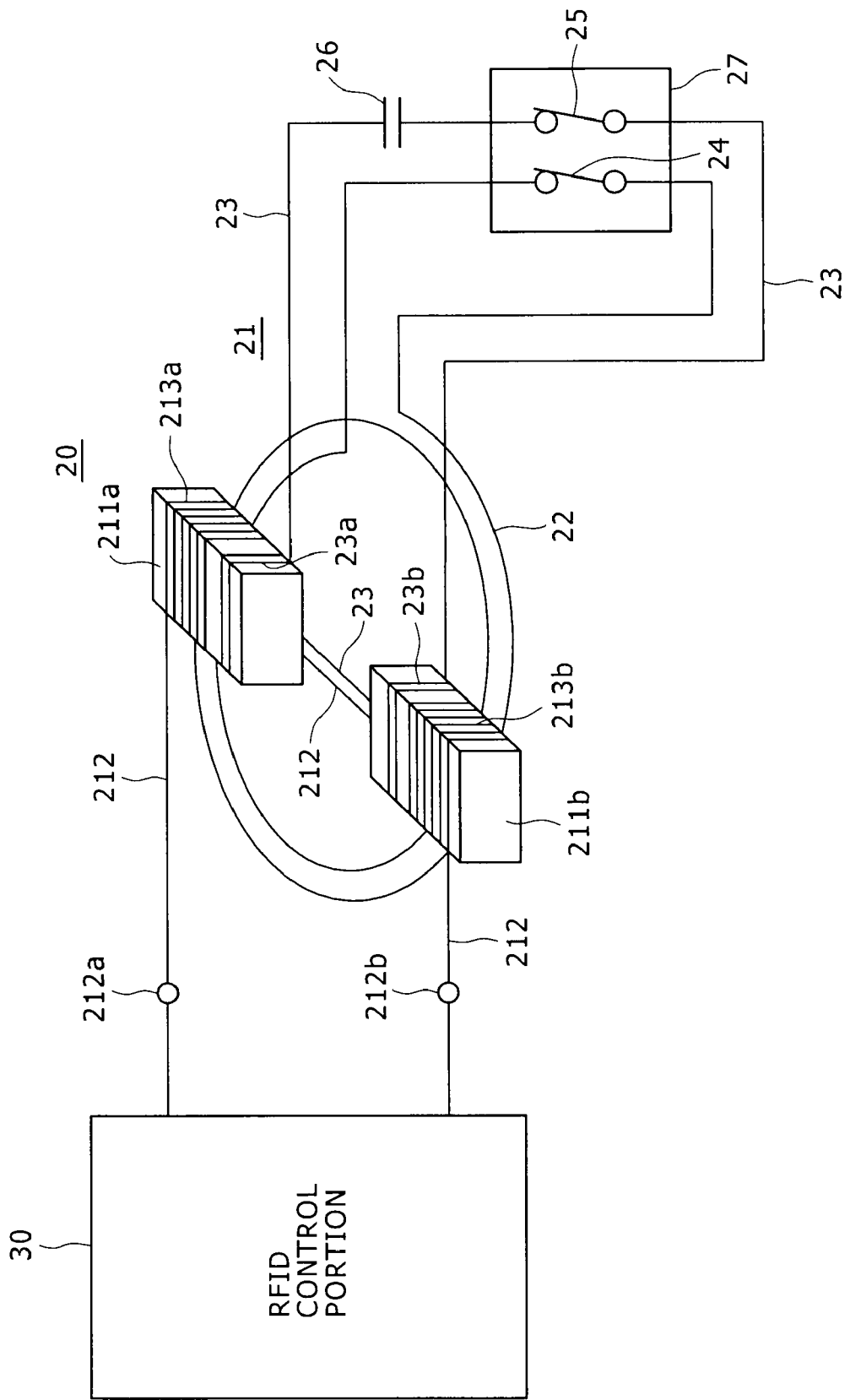
FIG. 1 is an explanatory view showing an NFC antenna (NFC: near field communication) of an embodiment according to the present invention.

FIG. 1 is a view showing an example of the configuration of an RFID NFC communication portion. The configuration includes an NFC antenna 20 (or, "RFID antenna 20," herebelow) of the embodiment and an RFID control portion 30. In the present embodiment, the RFID control portion 30 (RFID: radio frequency identification) is formed from an RFID LSI.

The RFID antenna 20 is configured as an assembly (or, "antenna assembly") including a ferrite antenna 21, a loop coil 22, and a manual switching device.

The ferrite antenna 21 has a bisectional configuration, similarly as in the Related Art example. More specifically, the ferrite antenna 21 of the embodiment is formed in the manner that a single copper wire 212 is wound on each of two ferrite cores 211a and 211b. Thereby, respective coils 213a and 213b are formed.

Alternatively, the ferrite antenna 21 can be configured such that the respective antenna coils 213a and 213b are formed in the manner that the copper wire 212 formed by as a conductive pattern on a flexible substrate is wounded on the respective ferrite cores 211a and 211b. Then, respective assemblies of wire windings on the ferrite cores 211a and 211b are connected together by the copper wire.

The loop coil 22 is disposed in a position in which the loop coil 22 is interlinked with a magnetic flux generated from the coils 213a and 213b and on the non-communication direction side (refer to the Related Art description) with respect to the ferrite antenna 21. In the example shown in FIG. 1, the loop coil 22 is disposed in the position with respect to the ferrite antenna 21 such that the loop coil 22 partly opposes respective lower portions of the ferrite cores 211a and 211b.

A switch 24 is interposed between one end and the other end of the loop coil 22. In accordance with on and off states of the switch 24, the loop coil 22 is switched between a loop open state and a loop closed state.

Further, in the present embodiment, correction coils 23a and 23b are configured in the manner that a copper wire 23 is wound on respective ferrite cores 211a and 211b. A switch 25 and a correction capacitor 26 are series connected and provided between one end and the other end of the copper wire 23. In operative association with switching of the loop coil 22, the switch 25 switches between two modes of the respective correction coil 23a, 23b. In one of the two modes, one end and the other end of the respective correction coil 23a, 23b are connected together (operative mode of the respective correction coil 23a, 23b). In the other mode, one end and the other end of the respective correction coil 23a, 23b are disconnected from one another (inoperative mode of the respective correction coil 23a, 23b).

In the present embodiment, the switches 24 and 25 are configured as respective switches of a double pole switch 27. The double pole switch 27 is configured to switch between the switches 24 and 25 in operative association with one another in response to a slide operation.

The correction coils 23a and 23b and the correction capacitor 26 are used to correct for variation in the resonant frequency of the RFID antenna 20 in response to switching of the switch 24, 25.

In the RFID antenna 20, one end 212a and the other end 212b of the coils 213a and 213b (that is, the one end and the other end of the copper wire 212) are connected to the input/output terminals of the RFID control portion 30.

The RFID control portion 30 operates such that, in the event of transmission, ASK modulated carrier signals are supplied to the coils 213a and 213b of the RFID antenna 20, and the RFID antenna 20 is thereby excited, whereby transmission is performed with electromagnetic waves. Further, in the event of reception, the RFID control portion 30 operates such that current excited by the coils 213a and 213b to extract current, which is excited with electromagnetic waves received on the RFID antenna 20, is received as a received signal.

Figure 6A:
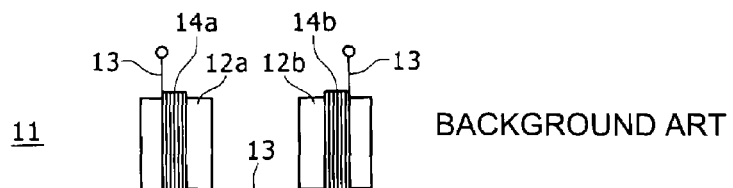
FIGS. 6A to 6C are explanatory view showing one example of a loop antenna.
Figure 6B:
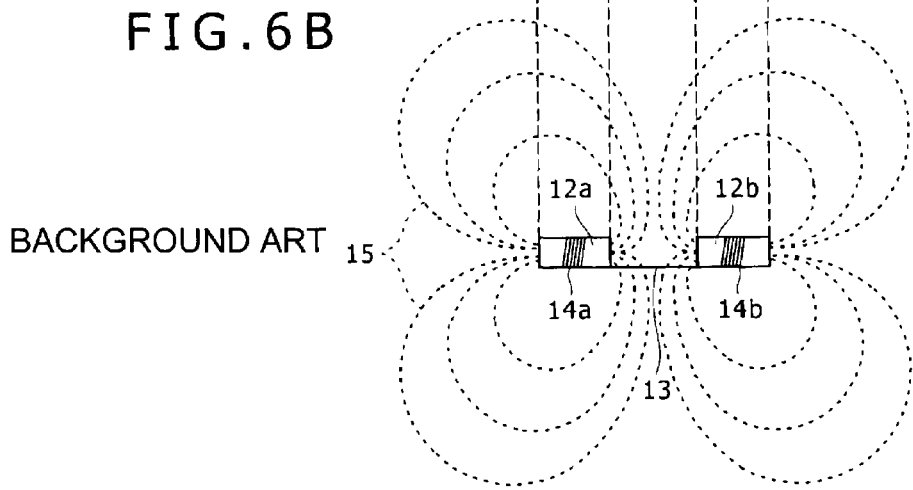

More specifically, the RFID antenna 20 configured as described above operates as described hereinbelow. In the event the double pole switch 27 is operated by a user and the switches 24 and 25 are turned off thereby, either the loop of the loop coil 22 is disconnected or the ends of the correction coils 23a and 23b are disconnected from one another. Consequently, the RFID antenna 20 operates only with the ferrite antenna 21, in which, as shown in FIG. 6B, the directivity is low and communication in the wide coverage area is enabled.

Alternatively, in the event the double pole switch 27 is operated by the user and the switches 24 and 25 are turned on thereby, the loop of the loop coil 22 is closed, and the ends of the correction coils 23a and 23b are connected together. Thereby, the RFID antenna 20 is set to a state where the ferrite antenna 21 and the loop coil 22 are connected together.

Figure 6C:
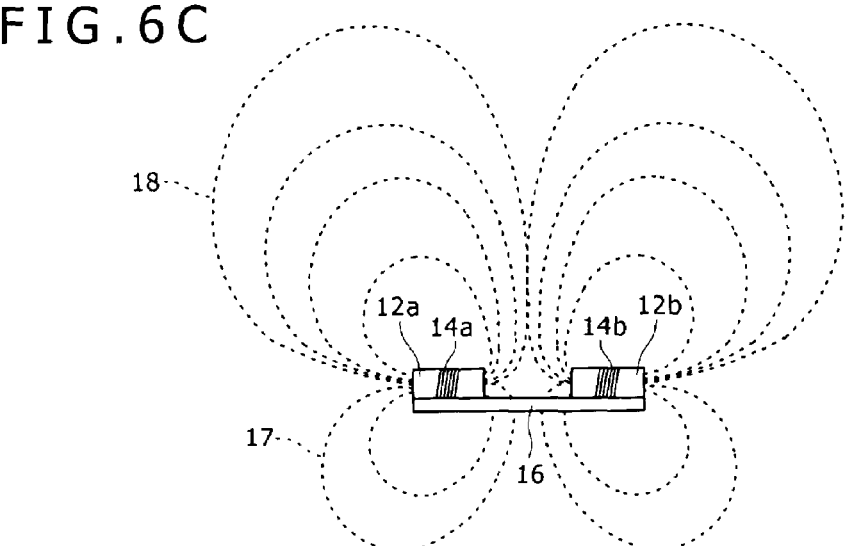

In the above-described state, when the current flows to the coils 213a and 213b, the magnetic flux is thereby generated. Thereby, overcurrent is generated in the direction of cancelling the interlinking magnetic flux, similarly as in the case of the metal plate 16 shown in FIG. 6C. Since the loop coil 22 is disposed on the non-communication direction side, the magnetic flux on the non-communication direction side is cancelled, and self-inductances of the coils 213a and 213b are reduced. As such, the current flowing through the coils 213a and 213b are increased. In this case, as shown in FIG. 6C, the increased amount of the current causes an increase in the magnetic flux on the communication direction side (refer to the Related Art description). Consequently, the directivity on the communication direction side is enhanced.

In this case, the resonant frequency of the RFID antenna 20 is increased because of the reduction in the self-inductances of the coils 213a and 213b. According to the present embodiment, however, since the loop of the correction coils 23a and 23b is formed, the correction capacitor 26 enters within the current loop of the correction coils 23a and 23b. As such, an amount of capacitance contributing to the resonant frequency is increased by the amount of capacitance of the correction capacitor 26. Thereby, the resonant frequency is corrected so as not to vary.

As described above, according to the RFID antenna 20 of the present embodiment, the double pole switch 27 is operated to perform the ON/OFF switching of the respective switch 24, 25. As such, the communication mode can be easily switched between first and second modes. In the first mode, communication can be performed with a low directivity in a wide coverage; and in the second mode, the directivity in the communication direction is high, and the reception sensitivity in the communication direction is high.

Further, according to the present embodiment, by the switching operation described above, variations in the resonant frequency of the RFID antenna 20 can be corrected for with the correction coils 23a and 23b.

Second Embodiment

As described above, the manual switching device for switching between the directivity characteristics (or, "directivity-characteristic switching device," herebelow) is used in the first embodiment. However, the manual switch can be replaced with an electronic switch, thereby enable automatic control of the switching between the directivity characteristics. In this case, a function of a device for performing the automatic switching control of the electronic switch is included in a control portion of a mobile device including an NFC antenna of a second embodiment.

The following describes the NFC antenna of the second embodiment in which the electronic switch is used as the directivity-characteristic switching device. The NFC antenna of the second embodiment will be described together with a mobile device of the second embodiment employing the NFC antenna.

Figure 2:
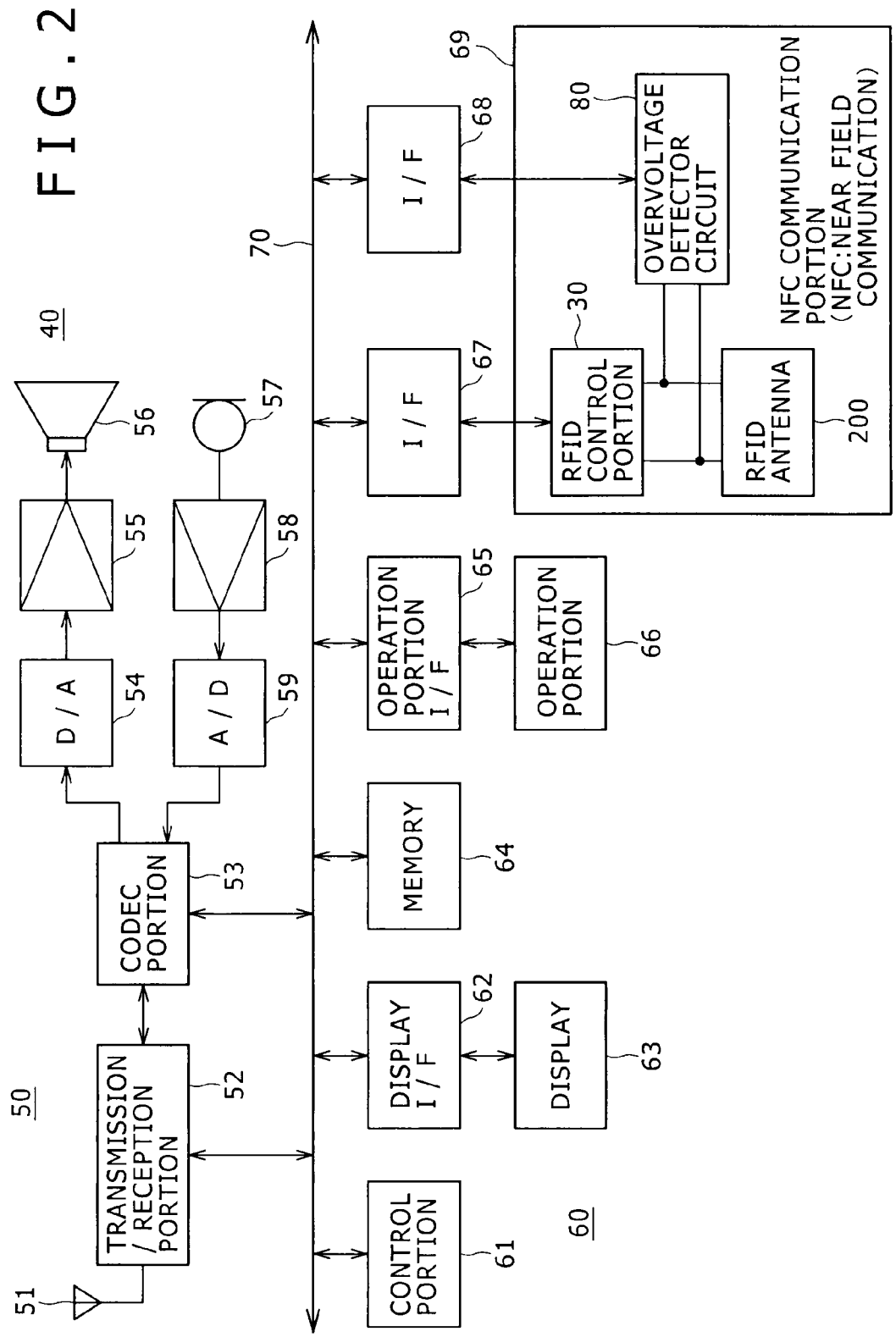
FIG. 2 is a block diagram showing a mobile device of an embodiment of the present invention, including an NFC communication portion of the embodiment.

FIG. 2 is a block diagram showing an example of the configuration of a mobile phone terminal 40 as an example of the mobile device of the second embodiment employing the NFC antenna of the second embodiment. The example mobile phone 40 includes a communication processing system 50 for executing phone communication and a control system 60. The communication processing system 50 and the control system 60 are connected to a system bus 70.

The communication processing system 50 includes a mobile phone antenna 51, a transmitter/receiver portion 52, a codec portion 53, a D/A converter 54 (D/A: digital-analog), an output amplifier 55, a speaker 56 constituting a telephone receiver, a microphone 57 constituting a telephone transmitter, a microphone amplifier 58, and an A/D converter 59.

Signals received through the mobile phone antenna 51 are supplied to the codec portion 53 through the transmitter/receiver portion 52, and then are decoded by the codec portion 53. A received speech signal decoded by the codec portion 53 is converted by the D/A converter 54 to an analog signal, is then supplied to the speaker 56 through the output amplifier 55, and is then sound-reproduced.

Further a speech signal collected through the microphone 57 is supplied to the A/D converter 59 through the microphone amplifier 58. Then, the digital signal is supplied to the codec portion 53, is coded thereby, is supplied to the antenna 51 through the transmitter/receiver portion 52, and is then transmitted therefrom.

According the present embodiment, the control system 60 is configured such that a control portion 61 including an MPU (microprocessor), a display interface 62 (display I/F), a memory 64, an operation portion I/F 65, an I/F 67, and an I/F 68 are connected to the system bus 70.

A display configured from, for example, an LCD (liquid crystal display) is connected to the display I/F 62. A key operation portion 66 including, for example, tenkeys and cursor key, is connected to the operation portion I/F 65.

Further, in the present embodiment, an NFC communication portion 69 is connected to the system bus 70 through the I/Fs 67 and 68.

The NFC communication portion 69 includes the RFID control portion 30 (described above), an RFID antenna 200 of the second embodiment, an overvoltage detector circuit 80 (described further below). The RFID control portion 30 is connected to the system bus 70 through the I/F 67, and an output of the overvoltage detector circuit 80 is coupled to the system bus 70 through the I/F 68.

Figure 3:
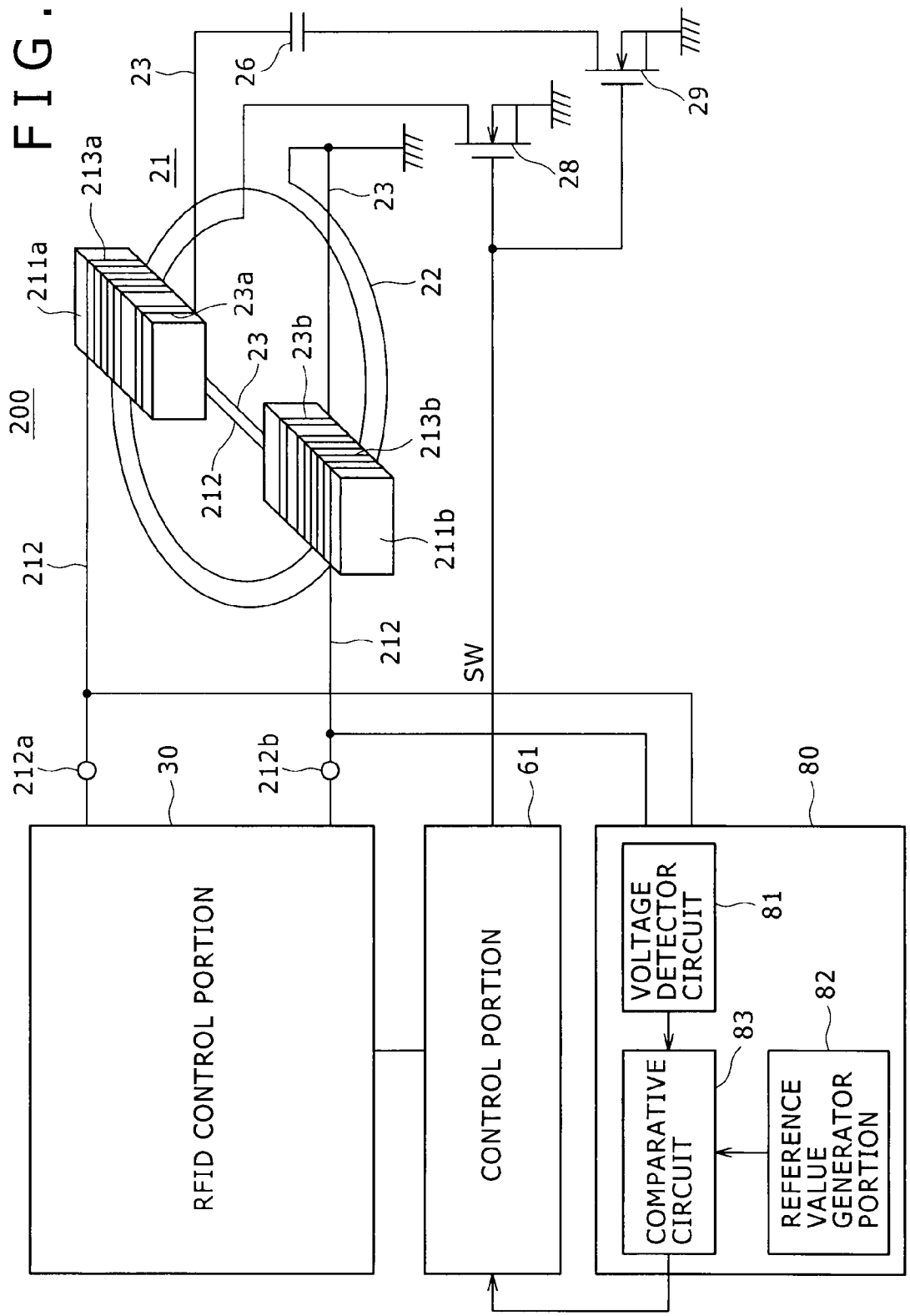
FIG. 3 is an explanatory view showing in detail an example of the configuration of the NFC communication portion in the mobile device of the embodiment shown in FIG. 2.

FIG. 3 shows an example of the configuration of the NFC communication portion 69 of the present embodiment. With reference to FIG. 3, the RFID antenna 200 has the same configuration as the RFID antenna 20 of the first embodiment, except that the directivity-characteristic switching is replaced with the electronic switch. As such, in FIG. 3, the corresponding portions are indicated with the same reference numerals as those in the RFID antenna 20 of the first embodiment shown in FIG. 1.

In the RFID antenna 200 of the second embodiment, one end of the loop coil 22, one end of the correction coil 23a, and one end of the correction coil 23b are connected to one another and are grounded. The other end of the loop coil 22 is grounded through a drain-source region of a FET 28 (FET: field-effect transistor) provided as a semiconductor switch device. The other ends of the respective correction coils 23a and 23b are grounded through the drain-source region of a FET 29 (semiconductor switch device).

A switch control signal SW supplied from the control portion 61 of the control system 60 is supplied to gates of the respective FETs 28 and 29, whereby the respective FETs 28 and 29 are switching-controlled. More specifically, when the respective FETs 28 and 29 are turned on in response to the switch control signal SW, then the loop of the loop coil 22 is closed, and concurrently, also the loop of the correction coils 23a and 23b is closed. Thereby, the RFID antenna 200 is set to the mode in which the directivity is high in the communication direction and the reception sensitivity is high.

Alternatively, when the respective FETs 28 and 29 are turned off in response to a switch control signal SW supplied from the control portion 61, the loop of the loop coil 22 is disconnected, and also the loop of the correction coils 23a and 23b is disconnected. Thereby, the RFID antenna 200 is set to the mode in which communication can be performed with a low directivity in a wide coverage.

According to the present embodiment, in the mobile phone terminal 40, during normal operation, the respective FETs 28 and 29 are turned on in response to the switch control signal SW. Thereby, the RFID antenna 200 is set to a mode in which, in the directivity characteristic, the directivity is high in the communication direction and the reception sensitivity is high.

In the event that an application program for communication using the NFC communication portion 69 between the mobile phone terminal 40 and an other mobile phone terminal has been activated, the MPU of the control portion 61 operates as follows. The MPU controls the respective FETs 28 and 29 to turned off in response to the switch control signal SW, thereby automatically switch the RFID antenna 200 to the mode for enabling communication with a low directivity in a wide coverage. Of course, the MPU of the control portion 61 controls the activation and operation of the application program using the NFC communication portion 69.

Further, according to the present embodiment, even in a case where the reception intensity of the carrier wave is excessively high, the control portion 61 performs control as described above. That is, the control portion 61 controls the respective FETs 28 and 29 to turned off in response to the switch control signal SW, thereby automatically switch the RFID antenna 200 to the mode for enabling the communication with a low directivity in a wide coverage. As such, as shown in FIGS. 2 and 3, the NFC communication portion 69 in the present example includes the overvoltage detector circuit 80 for detecting a state in which the reception intensity of the carrier wave is excessively high.

More specifically, in the state of an excessively high reception intensity, a reception level is saturated, and hence a limiter is imposed on the reception level. Thereby, the ASK modulated signal cannot be decoded to the extent of disabling communication, such that the directivity is reduced to thereby reduce the reception sensitivity, whereby such a problem is prevented.

The overvoltage detector circuit 80 includes a voltage detector circuit 81, a reference value generator portion 82, a comparator circuit 83. The voltage detector circuit 81 detects a voltage corresponding to the reception intensity upon receipt of a received signal voltage obtained in the region between the ends of the respective coils 213a and 213b. The reference value generator portion 82 generates a reference voltage for determination whether the reception intensity is excessive. The comparator circuit 83 performs comparison between the voltage received from the voltage detector circuit 81 and the reference voltage received from the reference value generator portion 82.

In the event the voltage corresponding to the reception intensity received from the voltage detector circuit 81 is higher than the reference voltage, the comparator circuit 83 supplies a comparison output signal indicative of the excessively high reception intensity to the control portion 61. Upon receipt of the comparison output signal indicative of the excessively high reception intensity, the control portion 61 operates such that the respective FETs 28 and 29 are turned off, thereby disconnecting the loop of the loop coil 22 and also the loop of the correction coils 23a and 23b. Thereby, the RFID antenna 200 is switched to the mode in which the directivity only with the ferrite antenna 21 is low, thereby to prevent communication from being disabled.

Figure 4:
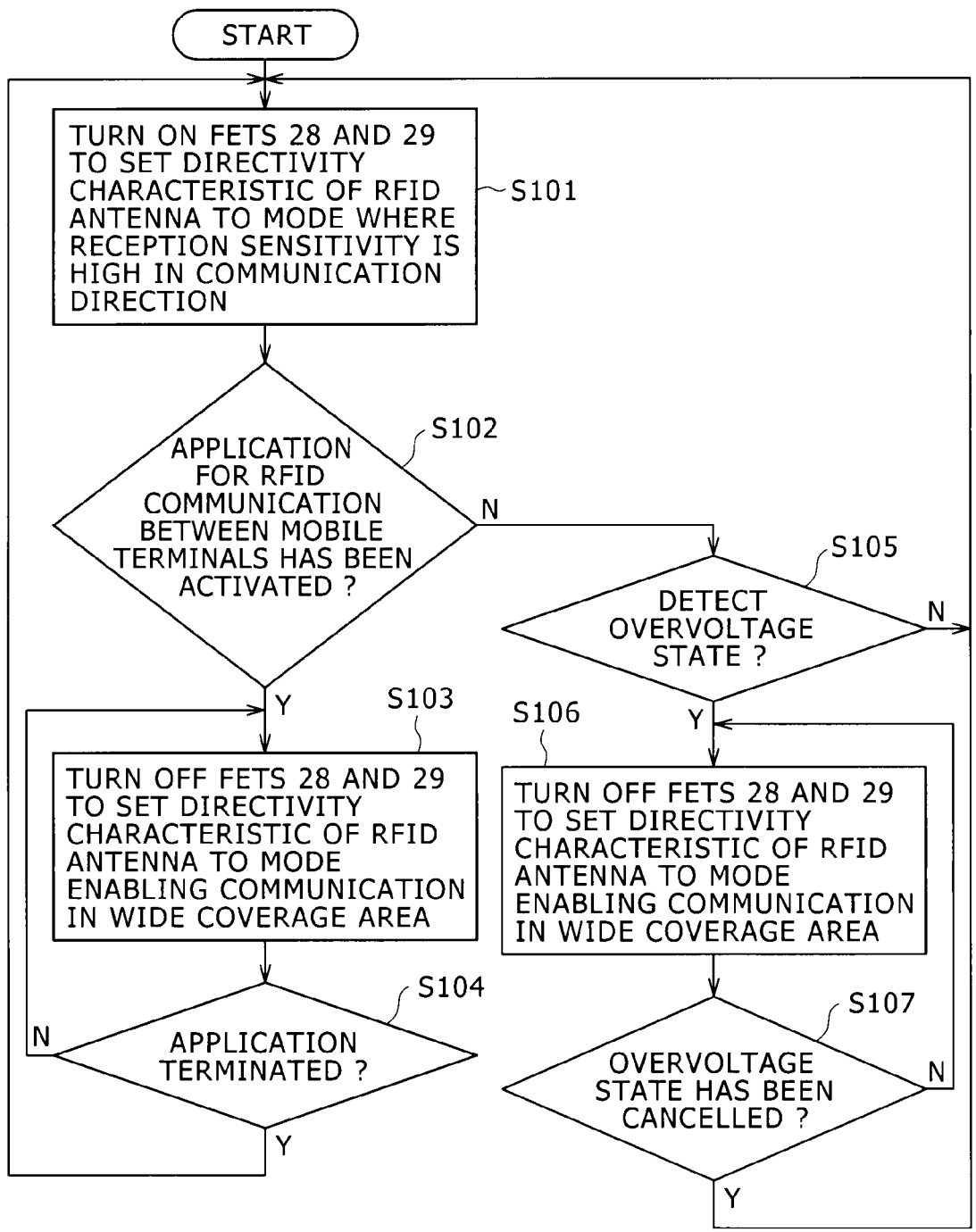
FIG. 4 is an explanatory flow diagram showing operation of switch control for switching the directivity of the RFID antenna, in which the operation is performed by the control portion of the mobile device of the embodiment.
Figure 5A:
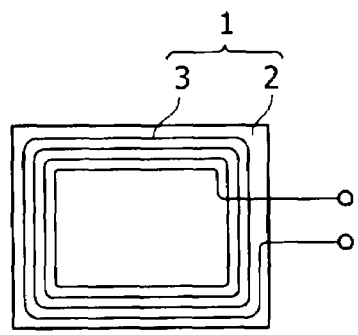
FIGS. 5A to 5C are explanatory view showing one example of a loop antenna.
Figure 5B:
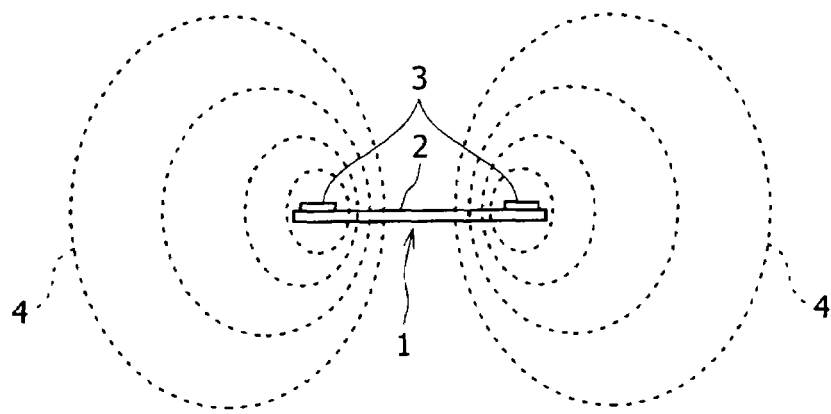
Figure 5C:
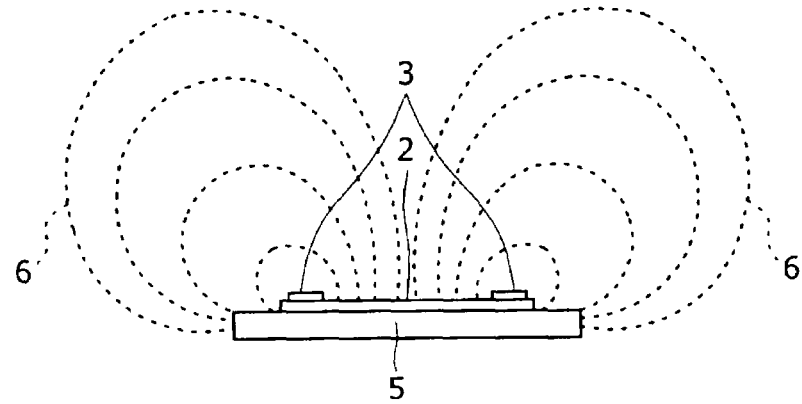

FIG. 4 is an explanatory flow diagram showing operation of switch control to be executed by the control portion 61 for switching the directivity of the RFID antenna 200.

The control portion 61 executes processing to perform the operation as described herebelow. To begin with, the FETs 28 and 29 of the NFC communication portion 69 are both turned on in response to the switch control signal SW to set the directivity characteristic of the RFID antenna 200 to the mode in which the directivity is high and the reception sensitivity is high in the communication direction (step S101).

Then, it is determined whether the application program (simply "application," hereinbelow) for performing the RFID communication between the mobile phone terminal 40 and an other mobile phone terminal has been activated (step S102). If, at step S102, it is determined that the application for performing the RFID communication has been activated, then the respective FETs 28 and 29 is turned off in response to the switch control signal SW. Thereby, whereby the directivity of the RFID antenna 200 is reduced, and the directivity characteristic thereof is switched to the mode for enabling the communication in a wide coverage area (step S103).

Then, it is determined whether the application for performing the RFID communication has terminated (step S104). If it is determined that the application has not yet terminated, the processing returns to step S103, at which the directivity of the RFID antenna 200 is reduced to thereby maintain the mode for enabling the communication in a wide coverage area. Alternatively, if, at step S104, it is determined that the application has terminated, the processing returns to step S101. At step S101, the respective FETs 28 and 29 are both turned on in response to the switch control signal SW, thereby to return the directivity characteristic of the RFID antenna 200 to the mode in which the directivity is high and the reception sensitivity is high in the communication direction.

If, at step S102, it is determined that the application for performing the RFID communication has not yet been activated, then it is determined whether the received signal voltage of the RFID antenna 200 is in an overvoltage state at step S105. If it is determined that the received signal voltage is not in the overvoltage state, then the processing returns to step S101. At step S101, the directivity characteristic of the RFID antenna 200 is maintained in the mode in which the directivity is high and the reception sensitivity is high in the communication direction.

Alternatively, if, at step S105, it is determined that the received signal voltage of the RFID antenna 200 is in the overvoltage state, then the respective FETs 28 and 29 are turned off and the directivity of the RFID antenna 200 is reduced. Thereby, the RFID antenna 200 is switched to the mode for enabling the communication in a wide coverage (step S106).

Subsequently, it is determined whether the overvoltage state has been cancelled (step S107). If it is determined that the overvoltage state is continued, then the processing returns to step S106, at which the directivity of the RFID antenna 200 is reduced, thereby to maintain the mode for enabling the communication in a wide coverage area. Otherwise, if, at step S107, it is determined that the overvoltage state has been cancelled, then the processing returns to step S101. At step S101, the respective FETs 28 and 29 are both turned on, thereby to return the directivity characteristic of the RFID antenna 200 to the mode in which the directivity is high and the reception sensitivity is high in the communication direction. This terminates the processing routine shown in the flow diagram.

OTHER EMBODIMENTS AND MODIFIED EXAMPLES

As described above, in the example of the configuration shown in FIG. 3, the overvoltage detector circuit 80 is provided in the NFC communication portion 69. However, the configuration may be such that the voltage obtained in the region between the ends of the coils 213a and 213b is converted to a digital signal and is supplied to the control portion 61 through the system bus 70. Further, the function of the overvoltage detector circuit 80 can be provided in the form of a configuration of a software process executable by the MPU of the control portion 61.

The respective one of the embodiments and examples has been described with reference to the example case in which the example of the mobile device is the mobile phone terminal. However, the present invention can even be adapted to any mobile devices other than the mobile phone terminal inasmuch as the devices have an NFC communication portion such as described above.

Further, in the example shown in FIG. 3, the FET is used for the electronic switch device. However, an electronic switch device of an other different type can of course be used.

It should be understood by those skilled in the art that various modifications, combinations, sub-combinations and alterations may occur depending on design requirements and other factors insofar as they are within the scope of the appended claims or the equivalents thereof.

What is claimed is:

1. A near field communication (NFC) antenna comprising:
 a ferrite antenna including a primary antenna coil wound on a ferrite core of the ferrite antenna;
 a loop coil provided on a side of the ferrite antenna in a position where the loop coil is interlinked with magnetic flux generated by the ferrite antenna;
 a loop coil switching unit configured to switch between a mode for forming a loop of the loop coil and a mode for disconnecting the loop;
 a correction coil wound on the ferrite core to correct for a resonant frequency, which varies depending on the modes for connecting and disconnecting the loop of the loop coil, the modes being set by the loop coil switching unit; and
 a correction coil switching unit configured to switch between a mode for connecting the correction coil and a mode for disconnecting the correction coil to operate in association with switching by the loop coil switching unit between the modes for forming and disconnecting the loop of the loop coil.

2. The NFC antenna as claimed in claim 1, wherein the loop coil switching unit is a manual switch.

3. The NFC antenna as claimed in claim 1, wherein the loop coil switching unit and the correction coil switching unit are configured from a double pole switch.

4. The NFC antenna as claimed in claim 1, wherein the loop coil switching unit is an electronic switch.

5. The NFC antenna as claimed in claim 1, wherein the loop coil switching unit and the correction coil switching unit are each configured from an electronic switch.

6. A mobile device comprising:
 an NFC communication portion, wherein an NEC antenna of the NEC communication portion includes,
  a ferrite antenna including a primary antenna coil wound on a ferrite core of the ferrite antenna;
  a loop coil provided on a side of the ferrite antenna in a position where the loop coil is interlinked with magnetic flux generated by the ferrite antenna;
  a loop coil switching unit configured to switch between a mode for forming a loop of the loop coil and a mode for disconnecting the loop;
  a correction coil wound on the ferrite core to correct for a resonant frequency, which varies depending on the modes for connecting and disconnecting the loop of the loop coil, the modes being set by the loop coil switching unit; and
  a correction coil switching unit configured to switch between a mode for connecting the correction coil and a mode for disconnecting the correction coil to operate in association with switching by the loop coil switching unit between the modes for forming and disconnecting the loop of the loop coil.

7. The mobile device as claimed in claim 6, wherein the loop coil switching unit is an electronic switch; and the mobile device further comprises a control unit configured to perform control such that, when a function using the NFC communication portion is activated, the loop coil switching unit is set to a mode for disconnecting the loop of the loop coil.

8. A mobile device comprising:
 an NFC communication portion, wherein an NFC antenna of the NFC communication portion includes,
  a ferrite antenna including a primary antenna coil wound on a ferrite core of the ferrite antenna,
  a loop coil provided on a side of the ferrite antenna in a position where the loop coil is interlinked with magnetic flux generated by the ferrite antenna;
  a loop coil switching unit configured to switch between a mode for forming a loop of the loop coil and a mode for disconnecting the loop, wherein the loop coil switching unit is an electronic switch;
 a detector unit configured to detect a state where a reception level of the NFC antenna is higher than a predetermined level; and
 a control unit configured to control the loop coil switching unit to switch to a mode for disconnecting the loop of the loop coil when the detector unit has detected a state where the reception level of the NFC antenna is higher than a predetermined level.

* * * * *